(No Model.)  
6 Sheets—Sheet 1.

T. CLARKE.
Sleeping Car.

No. 232,686. Patented Sept. 28, 1880.

Fig. I.

Witnesses:  
Fred. G. Dietrich  
P. C. Dietrich

Inventor:  
Thomas Clarke,  
by Louis Bagger & Co.  
his Attorneys (No Model.) 6 Sheets—Sheet 2.

T. CLARKE.
Sleeping Car.

No. 232,686. Patented Sept. 28, 1880.

Witnesses: Inventor:
Fred. G. Dieterich Thomas Clarke
P. H. Dieterich by Louis Bagger & Co.
his Attorneys (No Model.)  
6 Sheets—Sheet 3.
T. CLARKE.
Sleeping Car.
No. 232,686. Patented Sept. 28, 1880.
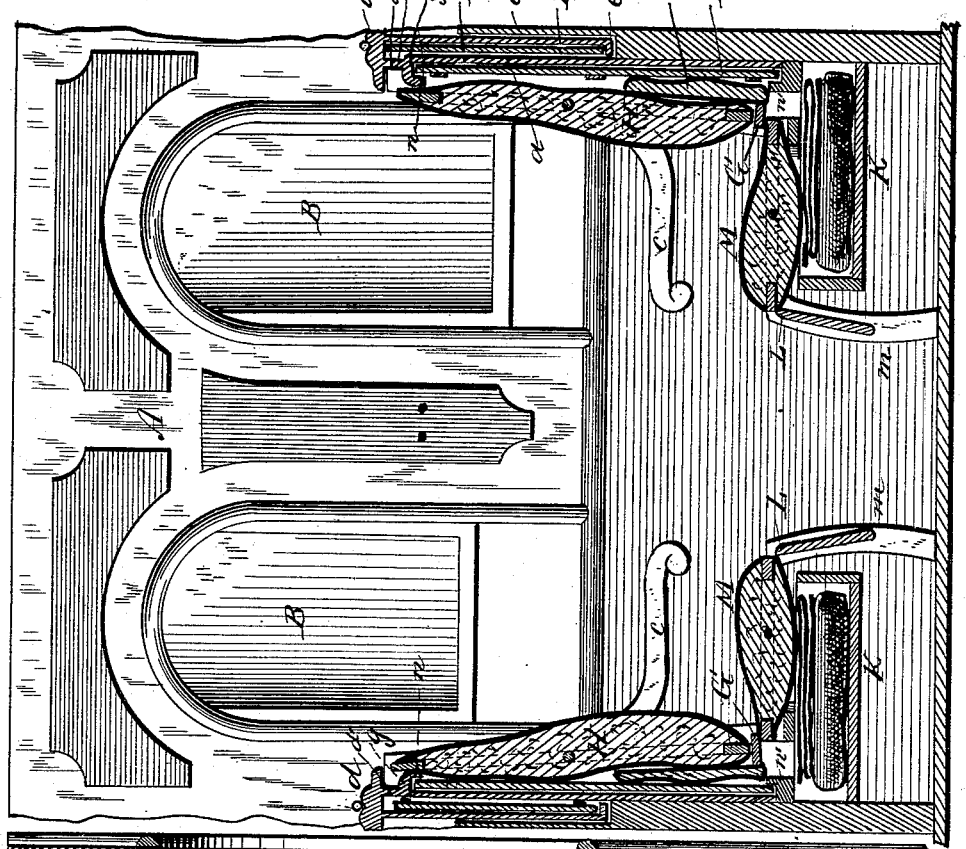
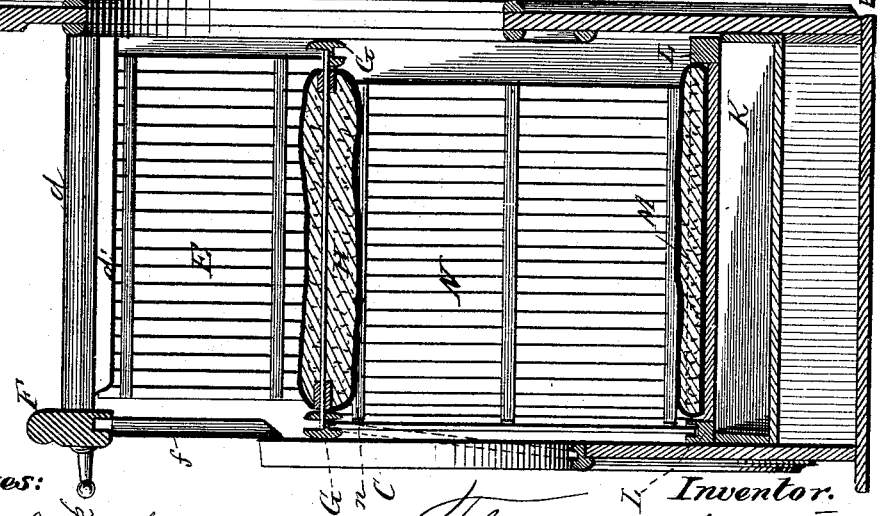
Witnesses:  
Fred. G. Dieterich  
P. C. Dieterich
Inventor:  
Thomas Clarke,  
by Louis Bagger  
Attorneys
N. PETERS, PHOTO-LITHOGRAPHER, WASHINGTON, D. C.

(No Model.)  
6 Sheets—Sheet 4.
T. CLARKE.
Sleeping Car.
No. 232,686. Patented Sept. 28, 1880.
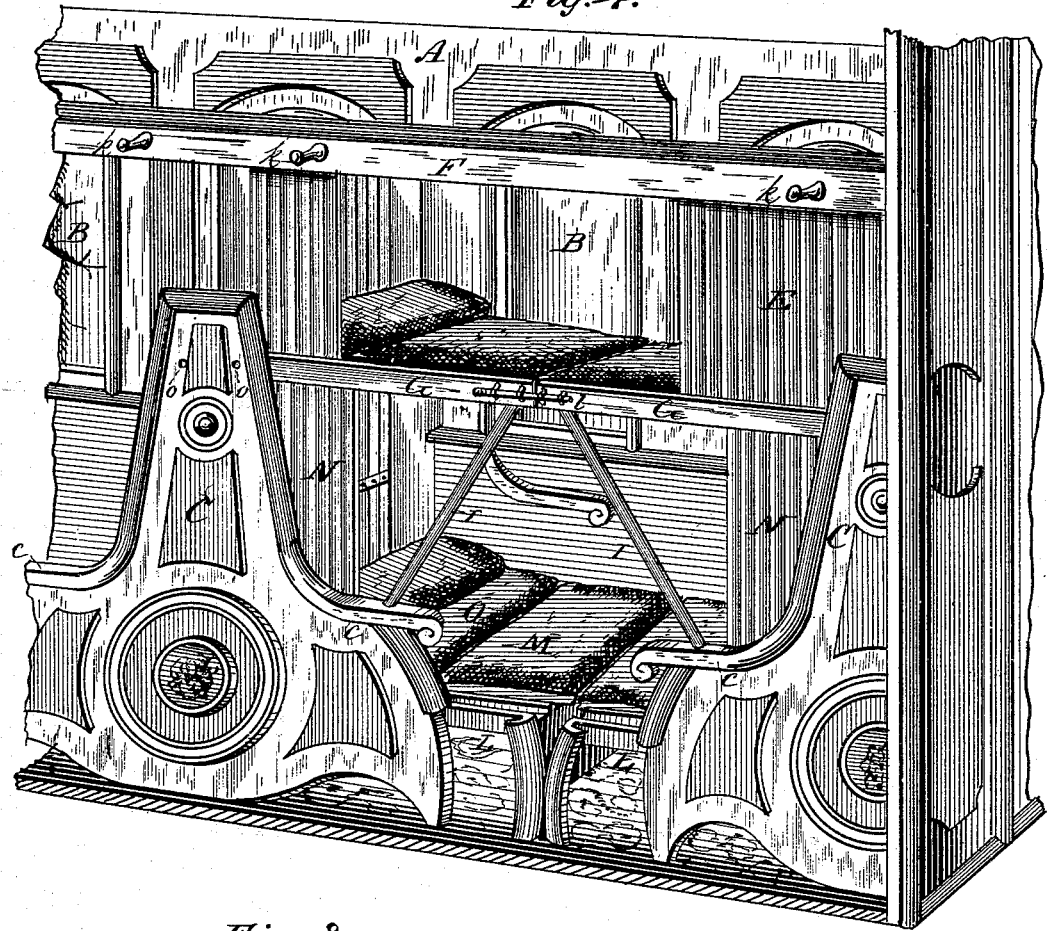
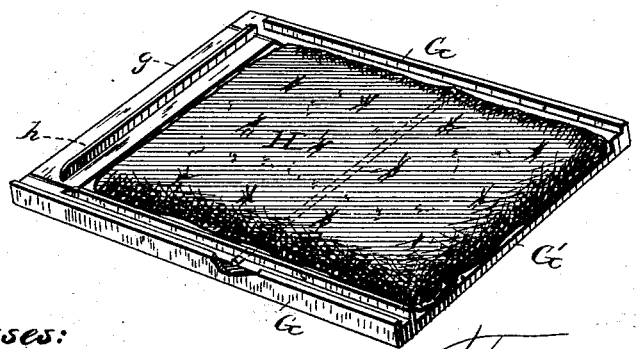

(No Model.)  6 Sheets—Sheet 5.

T. CLARKE.
Sleeping Car.

No. 232,686.  Patented Sept. 28, 1880.

Witnesses:
Fred. G. Dieterich
P. C. Dieterich

Inventor:
Thomas Clarke,
by Louis Bagger & Co.
Attorneys (No Model.) 6 Sheets—Sheet 6.

T. CLARKE.
Sleeping Car.

No. 232,686. Patented Sept. 28, 1880.

Witnesses: Inventor:
Fred G. Dieterich Thomas Clarke
P. C. Dieterich by Louis Bagger
 his attorneys

UNITED STATES PATENT OFFICE.

THOMAS CLARKE, OF TRURO, NOVA SCOTIA, CANADA.

SLEEPING-CAR.

SPECIFICATION forming part of Letters Patent No. 232,686, dated September 28, 1880.

Application filed August 7, 1880. (No model.)

*To all whom it may concern:*

Be it known that I, THOMAS CLARKE, of Truro, in the Province of Nova Scotia and Dominion of Canada, have invented certain new and useful Improvements in Palace and Sleeping Cars; and I do hereby declare that the following is a full, clear, and exact description of the invention, which will enable others skilled in the art to which it appertains to make and use the same, reference being had to the accompanying drawings, which form a part of this specification, and in which—

Figure 1:
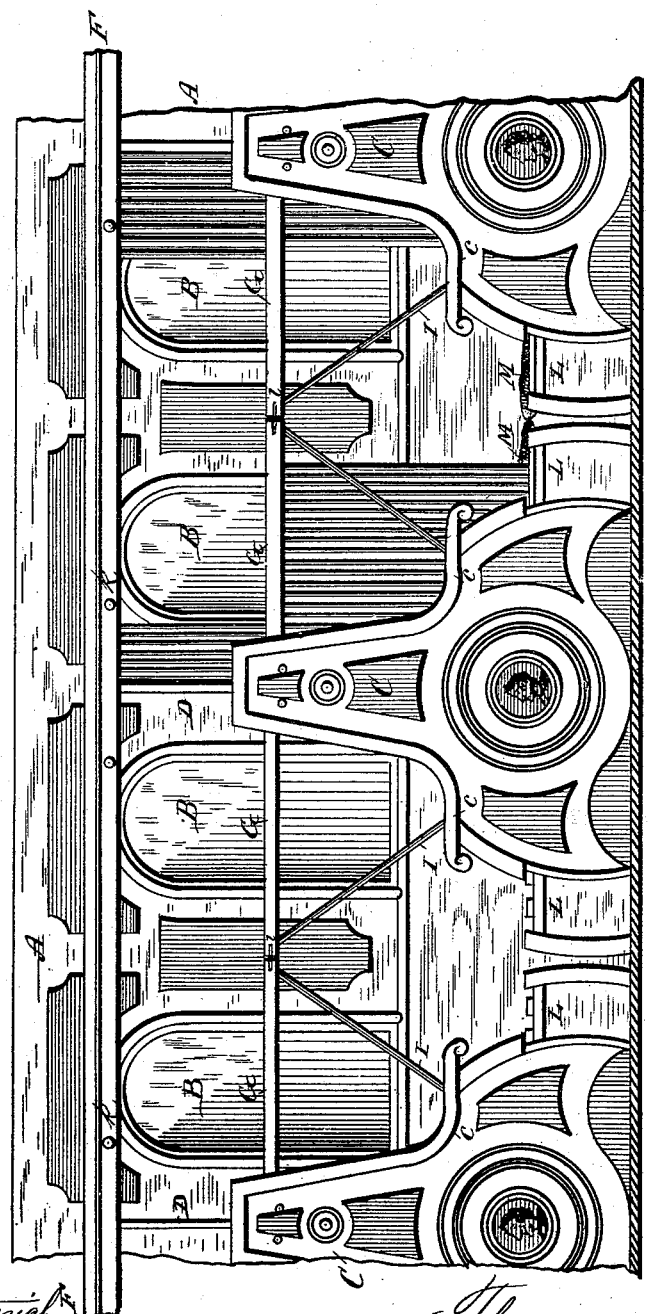
Figure 2:
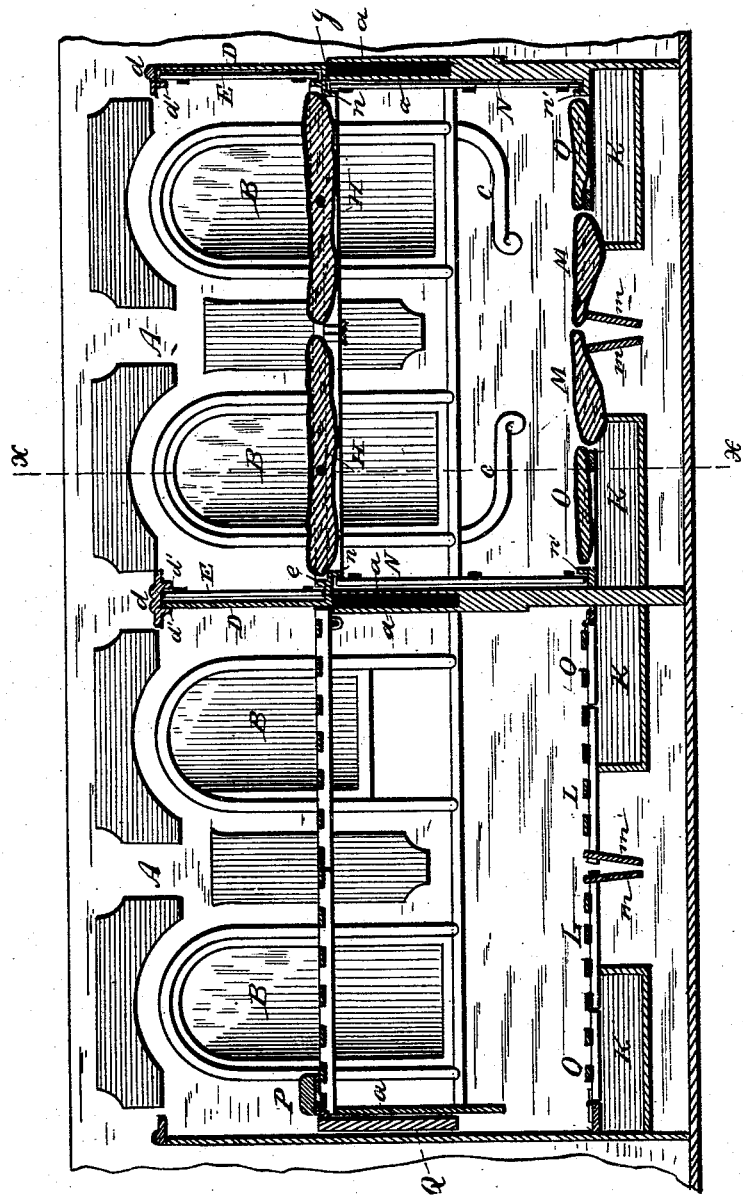
Figure 5:
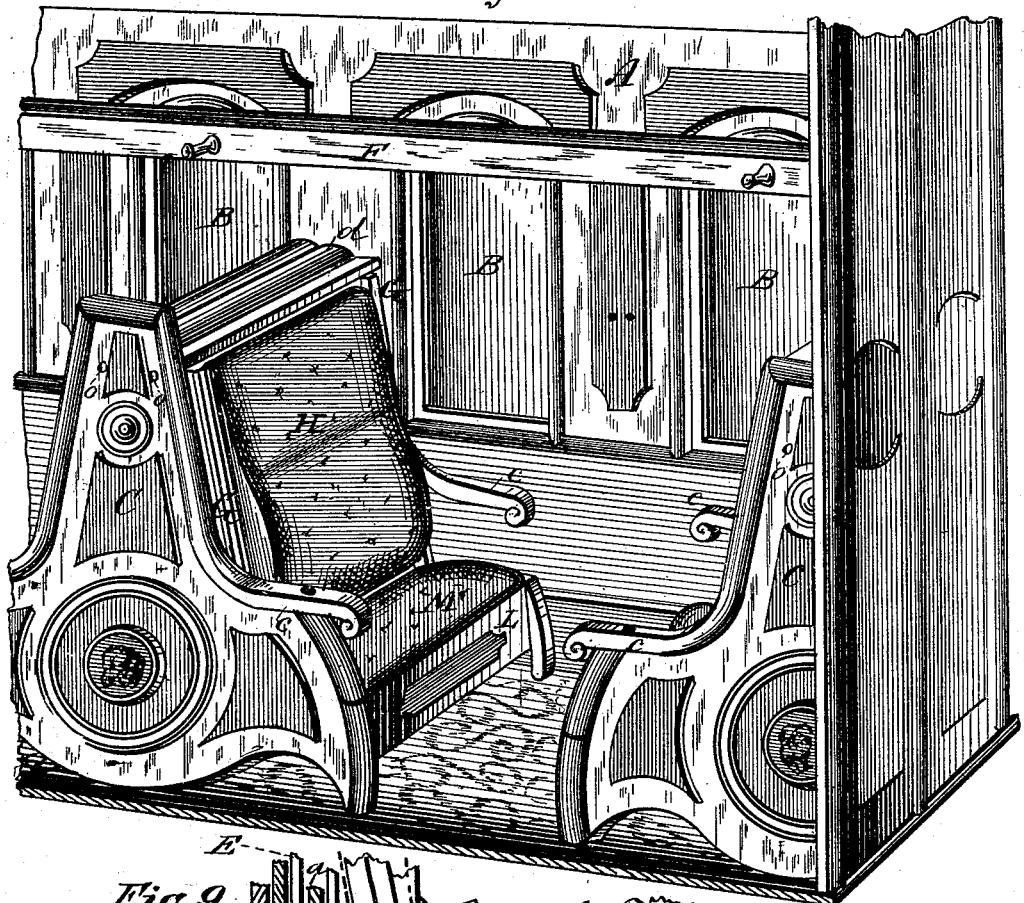
Figure 9:
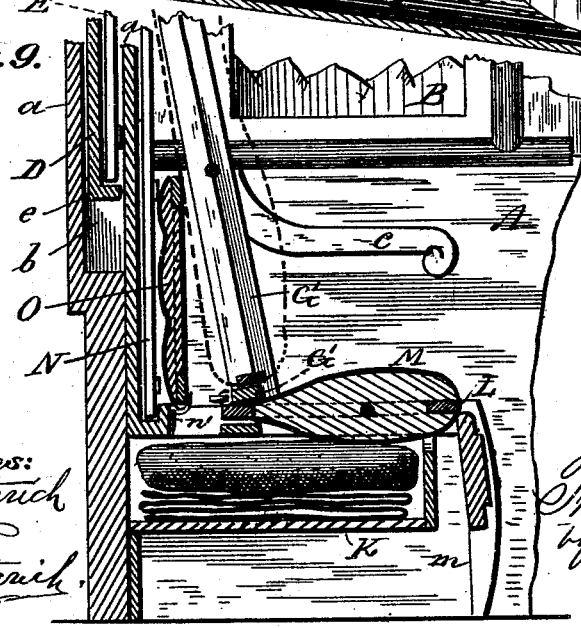
Figure 7:
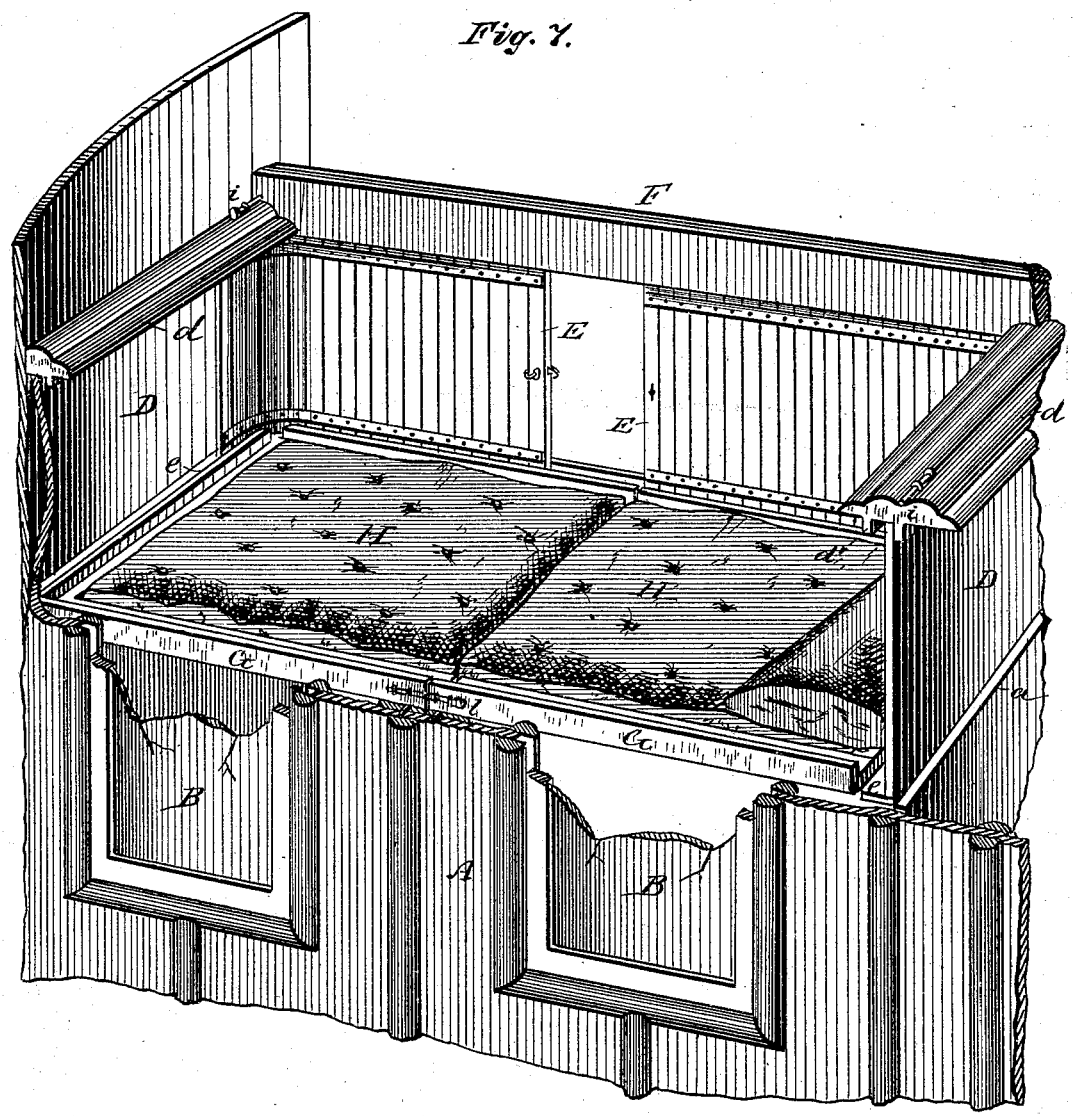

Figure 1 is a front view, representing two sections of the car, one of which is adjusted as a first-class upper and lower sleeping-berth and the other as second-class berths. Fig. 2 is a longitudinal vertical section of the same. Fig. 3 is a vertical transverse section through line $x\ x$, Fig. 2. Fig. 4 is a perspective view of the first-class section adjusted as an upper and lower sleeping-berth. Fig. 5 is a similar view, showing the section adjusted as in a parlor or drawing-room car. Fig. 6 is a vertical longitudinal section of the view represented in Fig. 5. Fig. 7 is a perspective top view of an upper first-class sleeping-berth. Fig. 8 is a perspective view of one of the seat-back frames with its reversible back, and Fig. 9 is an enlarged sectional view of one of the sliding seats.

Similar letters of reference indicate corresponding parts in all the figures.

My invention has relation to sleeping-cars, and has for its object to construct a car which is adapted for use during the day-time as a parlor or drawing-room car and during the night-time as a sleeping-car.

To this end it consists in the construction and combination of parts, as hereinafter described, and particularly pointed out in the claims, by which I attain great simplicity and durability of construction, the utilization of all available space, superior ventilation, and the perfect comfort, privacy, and safety of the traveler.

In the accompanying drawings, A represents one of the sides of a car, which has windows B B, (by preference two for each section,) each of which should preferably have two sashes with meeting-rails like an ordinary house-window, so as to open the upper sash from the top and the lower sash from the bottom, if desired.

C C are the inner seat supports or frames, which should be made of an attractive design and suitably ornamented, and are provided with the arm-rests $c\ c$. Each of the frames C is connected with the wall or side A of the car by parallel partitions $a\ a$, set some distance apart, so as to leave a narrow space or opening, $b$, between of sufficient width to receive the sliding partition D, the upper end of which has a flanged head or top piece, $d$, the laterally-projecting flanges of which rest upon the top edges of the stationary partitions $a\ a$ when the vertically-sliding partition D is down. This partition D has also a bottom flange or shoulder, $e$, and an outer or end flange, $f$, while one of the upper head flanges, $d$, has a downwardly-projecting rib, $d'$, so that the body of the partition D, with its several flanges $d\ d'\ e\ f$, forms a shallow box or recess to receive the adjustable slat-screen E.

In practice it is customary to make the sections of a sleeping-car each about six feet long in the clear and three feet in width, and as the sliding screens E are each of a corresponding width it follows that when both are drawn out of their boxes or recesses in their respective partitions D they will meet midway of the berth—that is, of course, when both are drawn out to their full length. The upper rib, $d'$, is cut away or beveled at its outer end, and the front or edge flange, $f$, is similarly beveled to allow screen E to round the corner easily in pushing it out or in.

The top of each of the stationary partitions $a$ has a ledge, $g$, which is provided with a rib or flange, $h$, corresponding to flange $d'$ on the head $d$ of the sliding partition D, and, like this, cut off or beveled at its inner end to permit of the easy operation of the screens when partition D is drawn up to its full height, in which position it is locked in place by sliding bolts $i\ i$, one of which projects into the side of the car and the other one into a bar, F, which runs longitudinally through the car, one on each side of the center aisle, in a line with and some distance above the seat-frames C.

Bar F is grooved longitudinally on its under side to form ways for the sliding slat-screens E, and has pegs or hooks $k\ k$, arranged at proper intervals, for the accommodation of hats, bonnets, articles of clothing, and traveling utensils.

Hinged in opposite ends of the ledges g are the side arms, G G, of the swinging seat-backs, the inner one of which is grooved longitudinally on its upper and under sides, for the purposes hereinafter set forth. The hinged sides G G are united by the cross-piece G', thus forming a complete hinged frame of square or rectangular shape, within which is hinged, in the sides G G, the reversible upholstered back H. I prefer to construct this back of a square metal frame, the ends and sides of which are connected by bands of webbing or band-iron and suitably cushioned and upholstered on both sides, one end being upholstered somewhat thicker than the end opposite, to form the head-rest when the seat is reversed to form part of the upper berth. One side of the reversible back H is covered with brocade, rep, damask, or other suitable fabric, of ornamental pattern, while the other side is lined with ticking or other fabric suitable for mattress-covering.

The reversible seat is not hinged by its middle part within frame G G', but a little nearer the top than bottom, so that when the back is adjusted to the seat, as in Figs. 5 and 6, its top edge will impinge upon the ledge g of stationary partition a and its bottom edge move free of the bottom cross-bar, G', which enables the hinged back to adjust itself to the position of the occupant of the seat, giving him at all times a comfortable and easy support to the back.

When the two hinged frames G G' G of a section are adjusted to form the upper berth, as in Figs. 1, 2, 3, 4, and 7 of the drawings, their respective outer ends are secured in the side of the car by sliding bolts or other suitable fastenings, in like manner as the head d of the sliding partition D, while their inner meeting ends are locked together by a bolt, l.

The inner ends of the sides G G, which impinge upon partitions a, may have spring-catches to interlock with the partition or its ledge g; and in like manner the reversible backs H are, after they have been reversed to form the bottom of the sleeping-berth, locked in place within their respective frames by suitably-arranged bolts or spring-catches. The outer end of each reversible back being supported in its reversed position upon its respective ledge g, such fastening devices are required only at the inner or meeting ends of the reversible backs H H.

The outer corner of each of the hinged frames G G', with its reversible back H, is, when these frames are in their extended position to form a berth, supported upon the arm-rests c by rods or braces I I, the upper ends of which are hinged in their respective frames, while their lower ends are inserted into sockets provided in the arm-rests for their reception, which said sockets are provided with suitable locking devices.

When the frames G G' are folded down upon the partitions a a, as in Figs. 5 and 6 of the drawings, the hinged rods or braces I I are inserted into the grooves made in the under or inner sides of arms G G, so that these will lie flat up against the partition, with their hinged backs H reversed to bring the ticking or berth side toward the partition and the seat-back side toward the outside or facing the inside of the section.

The lower part of the section is provided with seats facing each other, and each of these consists of a stationary box or body, K, adapted to contain the pillows, bed-linen, blankets, &c., which is covered by a sliding frame, L, having a reversible hinged seat, M, constructed substantially like the reversible hinged backs H, and, like these, lined with some ornamental fabric to match that of the backs on one side, and with ticking or similar fabric on the opposite side.

The sliding seat-frames L have front legs or supports, m, and the stationary partition a back of the seat has a rib or flange, n', corresponding to a rib, n, projecting downwardly from the stationary ledge g, forming ways for a slat-screen, N, constructed like the corresponding screens E of the upper section, the ribs or flanges n n' being cut off or beveled at their outer ends, in like manner as flanges d' e, to enable the screen to turn the corner easily in pushing it either out or back. Upon the lower flange, n', is hinged an upholstered board or frame, O, of a width corresponding to that of seat-box K, for which it forms a covering when the sliding chair-section L, with its reversible seat M, is drawn out to form the lower berth.

When both chair-sections L opposite one another are drawn out and their seats reversed they, with the hinged frames O O, which will fall down in place of their own accord, will form the complete lower berth, the seats M being reversed to bring the ticking side uppermost, and suitably fastened by bolts, spring-catches, or other devices within their respective frames.

The side pieces of the stationary seat-boxes K, as well as of the sliding seat-frames L, are grooved to form channels for the sliding slat-screens N, the upper ends of which slide in the grooves or channels in the under side of arms G of the upper hinged frames. By drawing out both of these screens the lower berth may be entirely inclosed, while by drawing out the upper screens, E E, the upper berth of the section may be in like manner inclosed, thus affording absolute privacy for the occupants of the respective berths. At the same time the narrow spaces between the wooden slats forming the screens provide for ventilation, while at the same time the lower screens, N N, have another important function, viz., that of supporting frames G G' G G' of the upper berth when drawn out, so that even if the brace-rods I I or lock-bolt l should give way the berth-frame would still be supported upon the lower screens, N N.

If a person desires to occupy the entire section, he may, by adjusting one of the hinged back frames, G G', in a horizontal position only, provide a convenient shelf above his berth, on which to deposit articles of wearing-apparel or utensils.

It will be observed that when the section is transformed into sleeping-berths both the seats and backs are reversed, so that their facings and trimmings do not suffer from wear.

In the sections of a second-class car, or emigrant-car, I dispense with the upholstery, using plain slat seats and backs, as shown in the left-hand view, Figs. 1 and 2 of the drawings. In this case the sliding screen-partitions may also be dispensed with, if desired.

A block or frame, P, hinged to a flat board, Q, which drops into the space between the partitions a a, may be raised and turned down, as shown in Fig. 2, to form a head-rest for the upper berth.

The fastening devices by which the outer ends—i. e., the ends nearest the sides of the car—of arms G G are secured to the car should be of such a construction that they will, in a measure, yield or give as the car oscillates from side to side, which prevents tearing of the bolts, besides cushioning the motions of the berth.

During the day the hinged frames O O, which form the head and foot ends, respectively, of the lower berth, are turned up against the sliding lower screens, N, back of the hinged seat-backs, so as to be out of the way.

If desired, a mirror may be conveniently framed in each of the portions a back of the sliding screens, which will protect them during the day, but expose them for the use of the occupant or occupants of the section when this is transformed into sleeping-berths.

The sliding slat-screens may be provided with suitable latches or locking devices, so that they can be opened or closed only by the occupant of the berth from within.

When the car is not in use, by reversing the car seats and backs in the manner described, coverings may be dispensed with and the upholstery always kept clean and free from dust or from fading by exposure to the sunlight.

The seat-supports C C, facing the middle aisle, should at their upper ends be connected to the side of the car nearest it by flat metal bars o o on opposite sides of the central portions, a a, which bars are bolted at one end to the side of the car and at the other end to the upper part of the seat-frames C. These bars also serve as hinge-fulcrums for the hinged frames G G' G, the weight of which, whether in their vertical or horizontal position, it will thus be seen, is not supported by the thin partitions a, but by bars o, the ends of which are supported in the sides of the car and the seat-frames C, respectively.

From the foregoing description, taken in connection with the drawings, it will be seen that the parts of my car are so constructed and combined as to provide great lightness, excellent ventilation, considerable saving of space between the sections endwise, (all the space required between the dividing-partitions a a being what is needed to admit of the insertion of the thin adjustable partition D with its slat-screen E,) while at the same time the utmost privacy is secured to the occupants of the berths, and in case of accident the occupants of both the upper and lower berths may escape through the windows, if other means of exit are barred. Thus a want which has long been felt is supplied by my car, which is adapted both for day and night service.

Having thus described my invention, I claim and desire to secure by Letters Patent of the United States—

1. In a sleeping-car, the sliding slat-screen partitions E E N N, for separating, respectively, the upper and lower berths from the middle aisle or common passage-way, as set forth.

2. In a sleeping-car, the vertically-adjustable partitions D, provided with sliding slat-screens E, as set forth.

3. In a sleeping-car, the longitudinal grooved bars F, forming ways for and in combination with the upper sliding slat-screens or partitions, E, as set forth.

4. In a railway-car seat, the hinged back-frame G G' G, having reversible upholstered back H, hinged and swinging within the frame, as set forth.

5. The car seat or couch composed of the stationary frame or box K, hinged cover O, sliding extension-frame L, having hinged reversible seat M, rigid back a, and hinged back-frame G G' G, provided with the hinged reversible back H, as set forth.

6. In a railway-car, the combination, with the seats having rigid back-frames a, hinged back-frames G G' G, and sliding extensions L, of the slat-screen N interposed between the rigid back-frame a and hinged frame G G' G, as set forth.

7. The combination, with the seat supports or frames C and rigid partitions a a, of the sliding partition D, provided with the flanged top or head d and adjustable slat-screen E, as set forth.

8. In a railway-car, the combination of the rigid side or wall A, longitudinal grooved bar F, parallel to the wall, seat frames or supports C, having rigid partitions a a, and sliding partition D, carrying the sliding slat-screen E, and provided with the flanged top or head piece, d, having lock-bolts or fastening devices i i, as set forth.

9. In a railway-car, the combination of the partitions a a, having ledges g g, sliding partition D, having slat-screen E, and provided with fastening devices for locking it in its extended position, hinged frame G G' G, carrying the hinged reversible seat-backs H and grooved or channeled on one side to receive the lower end of the adjustable slat-screen E when these and frames G G' G are in their extended position, as set forth.

10. In combination with the hinged and grooved arms G, the sliding slat-screens E, sliding in the upper grooves or channels, and hinged brace-rods I, fitting into and concealed by the lower grooves or channels when the frames of which said arms form part are turned down, as set forth.

11. In a sleeping-car, the combination, with the transverse partitions $a\ a$, separating the sections endwise, of the hinged upper berth-sections, composed of hinged frames G G' G G G' G, provided with hinged reversible bottoms H H and devices for locking said bottoms in place within their respective frames, with locking devices for fastening their outer meeting ends to the side of the car, with the inner lock-bolt, $l$, and with hinged brace-rods I, adapted to be stepped and locked into sockets in the lower arm-rests, $c\ c$, as set forth.

12. In a sleeping-car, the combination, with the upper berth, of a section of an extensible and adjustable slat-screen adapted to inclose the lower berth and support the frame or frames forming the bottom of the upper berth, as set forth.

In testimony that I claim the foregoing as my own I have hereto affixed my signature in presence of two witnesses.

THOMAS CLARKE.

Witnesses:
AUGUST PETERSON,
JAMES H. MANDEVILLE.